United States Patent [19]

Minch et al.

[11] Patent Number: 4,897,871
[45] Date of Patent: Jan. 30, 1990

[54] APPARATUS FOR TRANSMITTING AND/OR RECEIVING BALANCED SIGNALS ON A TWO-WIRE TELECOMMUNICATION LINE

[75] Inventors: Morris L. Minch, Coral Springs; Theodore W. Wagner, West Palm Beach, both of Fla.

[73] Assignee: Siemens Corporation, Iselin, N.J.

[21] Appl. No.: 31,336

[22] Filed: Mar. 26, 1987

Related U.S. Application Data

[60] Division of Ser. No. 627,243, Jul. 2, 1984, Pat. No. 4,682,356, which is a division of Ser. No. 350,028, Feb. 18, 1982, Pat. No. 4,485,277, which is a continuation-in-part of Ser. No. 137,810, Apr. 4, 1980, abandoned.

[51] Int. Cl.$^4$ .................................. H04M 3/22
[52] U.S. Cl. .................................. 379/377; 379/382; 379/385
[58] Field of Search .............. 379/252, 372, 373, 374, 379/375, 377, 382, 385, 412, 27, 32, 33

[56] References Cited

U.S. PATENT DOCUMENTS

| 4,189,626 | 2/1980 | Melerba et al. | 379/373 |
| 4,431,868 | 2/1984 | Bolus et al. | 379/373 |
| 4,459,434 | 7/1984 | Benning et al. | 379/373 |
| 4,570,034 | 2/1986 | Serrano | 379/373 |

FOREIGN PATENT DOCUMENTS

| 0201635 | 11/1986 | European Pat. Off. | 379/373 |
| 0213342 | 3/1987 | European Pat. Off. | 379/252 |
| 2520974 | 11/1976 | Fed. Rep. of Germany | 379/373 |

Primary Examiner—Jin F. Ng
Assistant Examiner—Randall P. Myers
Attorney, Agent, or Firm—Adel A. Ahmed

[57] ABSTRACT

A transformerless hybrid circuit arrangement for a subscriber line interface circuit of a telecommunications exchange is disclosed. A preferred embodiment of the hybrid arrangement comprises a first and a second operational amplifier plus a differential amplifier connected together in the following manner: The non-inverting input of the first operational amplifier is connected to a first reference voltage and the output of this amplifier is connected (1) via a first resistor to one wire of the two-wire subscriber line, and (2) via a third resistor to the inverting input of the amplifier. The non-inverting input of the second operational amplifier is connected to a second reference voltage and to the receiving branch of the four-wire line of the telecommunications exchange. The output of this second operational amplifier is connected via a second resistor to the other wire of the two-wire subscriber line, via a fourth resistor to the inverting input thereof and via a fifth resistor to the inverting input of the first operational amplifier. Each of the two inputs of the differential amplifier are connected, via respective resistors, to one wire of the two-wire subscriber line and to the output of that operational amplifier which is connected to the other wire of the two-wire subscriber line. The output of the differential amplifier is connected to the transmitting branch of the four-wire line of the exchange.

3 Claims, 5 Drawing Sheets

APPARATUS FOR TRANSMITTING AND/OR RECEIVING BALANCED SIGNALS ON A TWO-WIRE TELECOMMUNICATION LINE

CROSS-REFERENCE TO RELATED APPLICATIONS

The present Application is a divisional application of application Ser. No. 06/627,243 filed July 2, 1984 which is itself a divisional application of application Ser. No. 06/350,028 filed Feb. 18, 1982 which is itself a continuation-in-part of original application Ser. No. 137,810, filed Apr. 4, 1980, now abandoned. Applications Ser. Nos. 06/350,028 and 06/627,243 have issued as U.S. Pat. Nos. 4,485,277 and 4,682,356, respectively.

This application is also related to the commonly-owned application Ser. No. 303,821 filed Sept. 21, 1981 now U.S. Pat. No. 4,396,805 for "Ring Trip Detector for a Subscriber Line Interface Circuit".

BACKGROUND OF THE INVENTION

The present invention relates to apparatus for transmitting and/or receiving, respectively, balanced signals on a two-wire line, such as a two-wire subscriber line in a telecommunication network.

The present invention has particular application to a subscriber line interface circuit for connecting a two-wire subscriber line with the four-wire line branches of a switching station (exchange) in a telecommunication network. In a telecommunication network a subscriber station, such as a telephone, data transmitting terminal or the like, usually communicates with the switching station via a two-wire subscriber line. Since the connections through the switching station are made with four wires, a subscriber line interface circuit which couples the subscriber line with the switching station must have a hybrid circuit for the two-wire/four-wire transition. This applies in particular to digital switching systems.

It is the function of such a hybrid to make possible a signal transfer from the two-wire line, utilized for both transmission directions, to the transmitting branch of the four-wire line and, vice versa, from the receiving branch of the four-wire line to the two-wire line, without signal cross-coupling from the receiving branch of the four-wire line to the transmitting branch thereof.

Hybrids constructed with inductive couplers—that is, transformers—have proved to be too large, heavy and expensive to mass produce. These hybrids also have a number of other disadvantages, such as the possibility of electromagnetic coupling between adjacent hybrids, and the attenuation losses exhibited by the transformers.

Because of these disadvantages, transformerless hybrids have been adopted which use operational amplifiers or differential amplifiers. A known hybrid of this kind is disclosed in the U.S. Pat. No. 4,041,252 to Cowden. It comprises two operational amplifiers in the receiving branch of the four-wire line. The inverting input of one of these amplifiers is connected with the non-inverting input of the other and these interconnected inputs form the receiving-side, four-wire line terminal. The output of the one amplifier is connected with the a-wire or ring lead and the output of the other with the b-wire or tip lead of the subscriber line via additional switching members serving to provide the DC supply voltage to the subscriber line.

The four-wire line output of this known hybrid is formed by a differential amplifier, whose two inputs are coupled to the two wires of the subscriber line, plus another operational amplifier connected after the differential amplifier. In addition there is a balancing network which lies between one wire of the subscriber line and one input of the output-side operational amplifier and which serves to balance the hybrid with respect to the impedance of the subscriber line. This minimizes the coupling of signal energy from the receiving branch of the four-wire line to the transmitting branch thereof.

This known transformerless hybrid has the advantage that it can be realized as an integrated circuit in a relatively straightforward manner. However, it fails to include a number of features which would be desirable in a subscriber line interface circuit. In particular, it would be advantageous if the hybrid could facilitate the indication of various circuit conditions, such as loop closure and/or loop current asymmetry in the subscriber line (due to ground key actuation, faulty insulation or when ringing current is injected into the line). It would also be advantageous if the hybrid circuit could facilitate over-current protection of the subscriber line; that is, to provide means for controlling the DC power applied to the line.

The present invention also has particular application to a line repeater circuit for providing amplified, balanced AC signals on one two-wire branch of a four-wire line in a telecommunication network. Such a repeater is desirable whenever a telecommunication line exceeds the length specified and intended by the design of the network. Such a repeater may be powered by a DC voltage phantomed onto the two-wire branch.

As with the hybrid circuit, it is desirable that the line repeater circuit h=designed in such a way that it can be implemented monolithically as an integrated circuit using well known IC manufacturing techniques.

SUMMARY OF THE INVENTION

It is an object of the present invention to provide separate circuits, connectable to a two-wire subscriber line, which may be utilized (1) to convert a balanced AC signal on the two-wire line into an AC signal on a single wire which is unbalanced with respect to ground; (2) to convert an AC signal on a single wire which is unbalanced with respect to ground into a balanced AC signal on the two-wire subscriber line; and (3) to detect an unbalanced condition (current asymmetry) on the two-wire subscriber line.

It is a further object of the present invention to provide a transformerless hybrid for a subscriber line interface circuit which facilitates the indication of various circuit conditions, such as loop closure and/or loop current asymmetry on the two-wire subscriber line, and facilitates over-current protection of the subscriber line.

It is a still further object of the present invention to provide circuits of the above-described type which can be implemented monolithically as integrated circuits.

The above noted objects, as well as other objects which will become apparent from the discussion that follows, are achieved, according to the present invention, by providing three basic transformerless circuit arrangements which may be used separately or combined to form a hybrid in a telecommunication system. The first circuit arrangement couples a two-wire subscriber line with the receiving branch of a four-wire line; the second circuit couples a two-wire subscriber line with the transmitting branch of a four-wire line and the third circuit functions to detect asymmetry in the current flowing over a two-wire subscriber line.

The first circuit arrangement comprises a first and second operational amplifier connected together in the following manner: The non-inverting input of the first operational amplifier is connected to a first reference voltage and the output of this amplifier is connected via a first resistor to one wire of the two-wire subscriber line and via a third resistor to the inverting input thereof. The non-inverting input of the second operational amplifier is connected to a second reference voltage and to the receiving branch of the four wire line. The output of this second operational amplifier is connected via a second resistor to the other wire of the two-wire subscriber line, via a fourth resistor to the inverting input thereof and via a fifth resistor to the inverting input of the first operational amplifier. This circuit arrangement operates to supply both a balanced AC and a controlled DC potential to the two-wire subscriber line.

The second circuit arrangement comprises a first voltage or current summing stage connected to the two wire subscriber line as follows: First and second inputs of this first summing stage are each connected via first and second resistors, respectively, to the ring and tip leads of the two-wire subscriber line. Third and fourth inputs of the summing stage are each directly connected, respectively, to the ring and tip leads. The output of the summing stage, which is connected to the transmitting branch of the four-wire line, produces an output voltage VS proportional to $VB+VR-VA-VT$, where VR is the voltage at the ring lead;
VA is the voltage at the first input;
VT is the voltage at the tip lead; and
VB is the voltage at the second input.

The third circuit arrangement permits the detection of an asymmetry in the current flowing over the two wires of the subscriber line, such as occurs when call (ring) current is injected into the line or, in the absence of ring current injection, upon ground key actuation at the subscriber station or a ground connection of the subscriber line due to faulty insulation. To this end, a second summing stage is provided and energized with the same input voltages as were applied to first summing stage mentioned above. A second differential amplifier compares the output voltage VC of the second summing stage with a reference voltage and an electronic switch, coupled to the second amplifier, changes its output state when a threshold is exceeded, thus supplying an indication criterion. The output voltage VC of the second summing stage is made proportional to $VT+VR-VA-VB$.

As noted above, these three circuit arrangements can be utilized independently, or connected together onto the same two-wire subscriber line to form a hybrid circuit. In this case, the first and second resistors in one of the circuit arrangements are the same as the first and second resistors in the other circuit arrangements. In a subscriber line interface circuit with such a hybrid circuit, there is no need for resistors of high absolute accuracy (only close matching) and the resistance of the individual circuit resistors can be kept relatively low (under 200K ohms). For these and other reasons, the three individual circuit arrangements, as well as the hybrid circuit, may be readily implemented as low cost integrated circuits.

According to one particular embodiment of the invention, a differential amplifier and an electronic switch, connected thereto, are connected to the output of the first summing stage to monitor the subscriber line for loop closure.

According to another embodiment of the invention, a circuit is provided to limit the current on the subscriber line. This circuit includes a threshold device, activated by the output signal of the first summing stage, which changes its operating state when that output signal reaches a threshold value. If this threshold value is exceeded, the circuit changes the DC reference voltage of the operational amplifier whose output is connected to the a-wire (ring lead) of the subscriber line to such an extent that the output signals of the two operational amplifiers are made approximately the same, thus limiting the current in the subscriber line.

For a full understanding of the present invention, reference should now be made to the following detailed description of the preferred embodiments of the invention and to the accompanying drawings.

DESCRIPTION OF THE PREFERRED EMBODIMENTS

Figure 1:
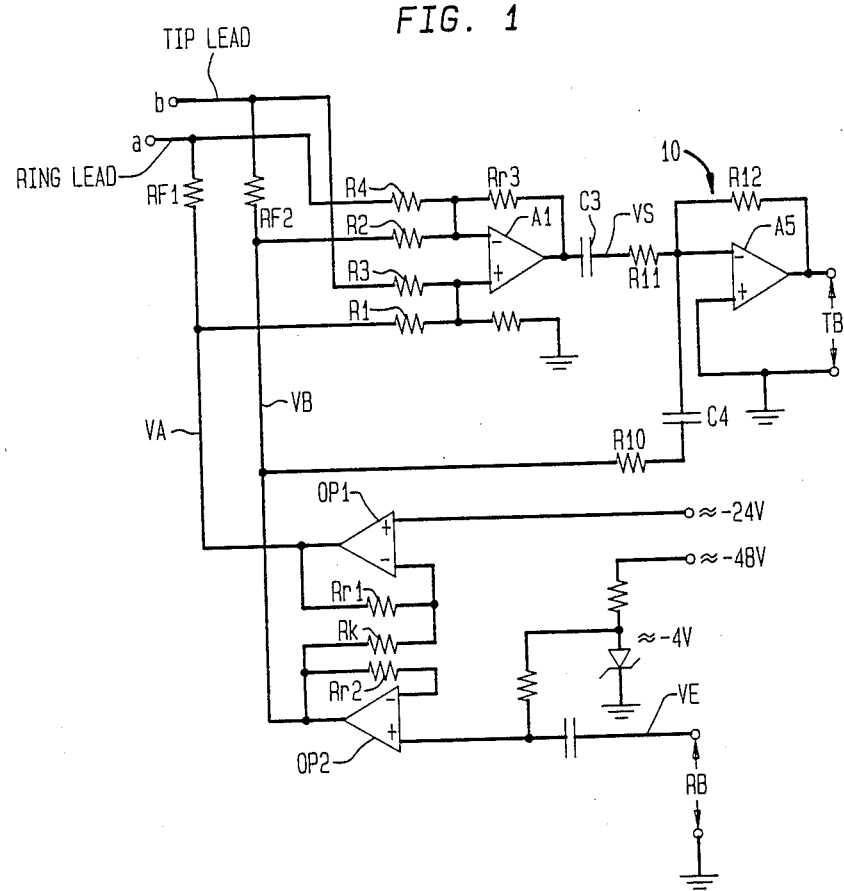
FIG. 1 is a schematic diagram of a transformerless hybrid for a subscriber line interface circuit according to one preferred embodiment of the present invention.

The hybrid circuit illustrated in FIG. 1 constitutes one preferred embodiment of the present invention and forms a part of a subscriber line interface circuit. This hybrid circuit comprises two operational amplifiers OP1 and OP2; that is, amplifiers with differential amplifier inputs, a very high input resistance, a very low output resistance, and a very high open loop gain.

A DC reference voltage (about $-24$ V) derived from the supply voltage source of the subscriber line is applied to the non-inverting input of the operational amplifier OP1. Another DC reference voltage (about $-4$ V) is applied to the non-inverting input of the other operational amplifier OP2. The signal VE from the receiving branch RB of the four-wire line is also connected to the non-inverting input of operational amplifier OP2. The outputs of the two operational amplifiers are fed back, via resistors Rr1 and Rr2, respectively, to the inverting inputs thereof. The output of the operational amplifier OP2 is furthermore connected via a resistor Rk to the inverting input of operational amplifier OP1.

The output of the operational amplifier OP1 is connected via a resistor RF1 with the a-wire (ring lead) of a subscriber line. In corresponding manner the output of operational amplifier OP2 is connected to the b-wire (tip lead) of the subscriber line via a resistor RF2, having preferably the same resistance value as the resistor RF1. The subscriber line serves to connect a telecommunication subscriber station, not shown, with the subscriber line interface circuit to which the described hybrid belongs. A typical subscriber station is, of course, a telephone.

A further component of the hybrid according to the invention is a differential amplifier A1. The non-inverting input of this differential amplifier is connected via a resistor R1 with the output of the operational amplifier OP1 and, in addition, via a resistor R3 with the b-wire of the subscriber line. In corresponding manner the inverting input of the differential amplifier A1 is connected via a resistor R2 with the output of the operational amplifier OP2 and via a resistor R4 with the a-wire of the subscriber line. The output signal VS of the differential amplifier is fed back via a resistor Rr3 to the inverting input thereof. This signal VS is also passed to the transmitting branch TB of the four-wire line via a cancellation circuit 10 that prevents the signal VE applied at the receiving branch RB from being passed to the transmitting branch TB.

The cancellation circuit 10 includes a differential amplifier A5 which receives at its inverting input (1) the AC signal VS via a coupling capacitor C3 and balancing resistor R11, (2) the AC signal VB from the operational amplifier OP2 via a balancing resistor R10 and a coupling capacitor C4, and (3) the amplifier output signal via a feedback resistor R12. The amplitude and phase of the signal VB is adjusted by varying the values of the resistor R10 and the capacitor C4. The non-inverting input of the differential amplifier A5 is grounded.

Thus, only an attenuated signal from the sources described reaches the terminals of the transmitting branch TB. The total phase shift due to capacitive coupling is equalized for optimum hybrid balancing.

Figure 2:
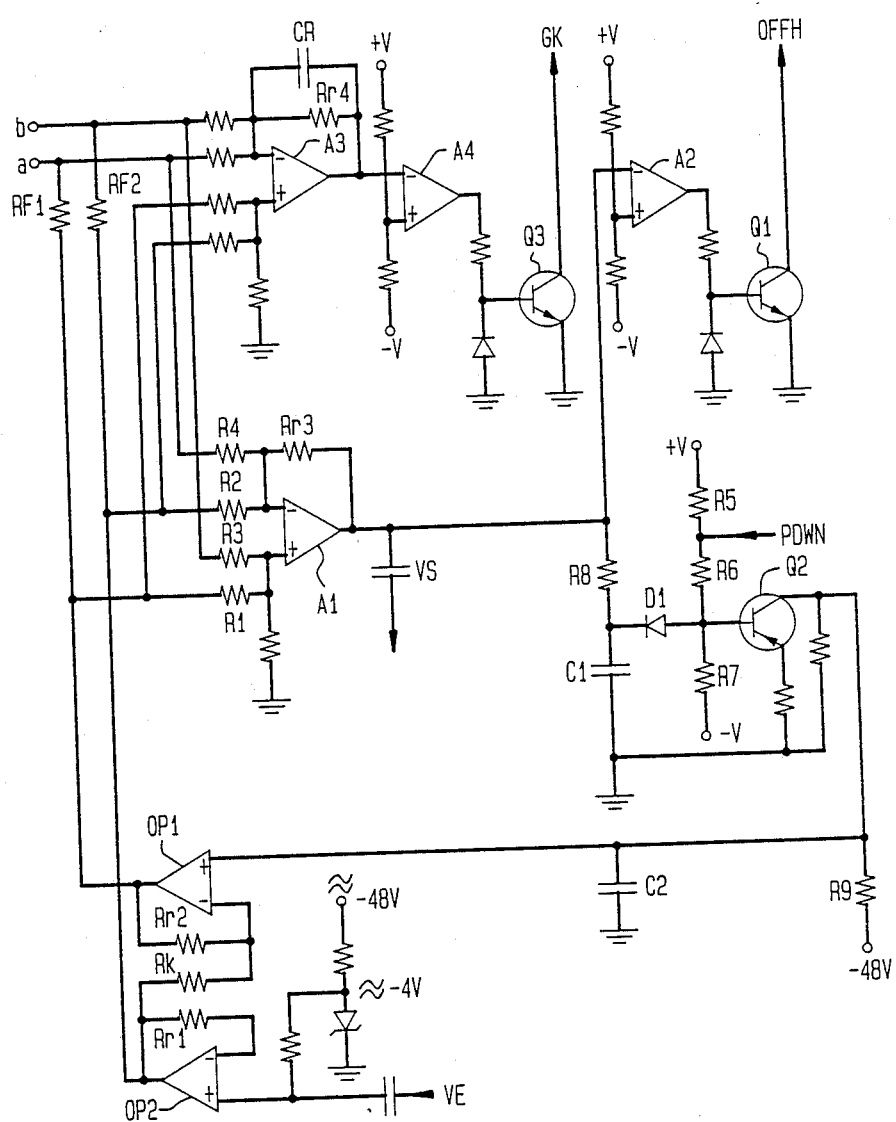
FIG. 2 is a schematic diagram of a transformerless hybrid for a subscriber line interface circuit according to another preferred embodiment of the present invention.

As shown in FIG. 2, the circuit arrangement according to the invention can be developed further in various ways, in particular for the purpose of performing various monitoring tasks. For example, in order to monitor the loop closure of the subscriber line comprising the a-wire and b-wire, the circuit includes a second differential amplifer A2 whose inverting input is connected with the output of the first differential amplifier A1 and whose non-inverting input is maintained at a DC reference voltage. The output of the differential amplifier A2 is connected to the control electrode (e.g. base) of a transistor Q1. The circuit parameters - that is, in particular the gain of the differential amplifier A1, the reference voltage applied at the non-inverting input of the second differential amplifier A2, and the bias of the transistor Q1 - are selected such that a subscriber loop closure, by means of the hook or receiver switch of the subscriber station, is indicated by an output signal OFFH. This occurs because the loop current flowing through the a-wire and b-wire causes the output signal of the first differential amplifier A1 to fall short of the reference voltage at the second differential amplifier A2, so that this second differential amplifier delivers an output signal which brings transistor Q1 into the conducting state. The presence of loop closure is therefore indicated upon corresponding evaluation of the collector potential OFFH. Because of the differential amplifier property of amplifier A2, and because of the amplitude relation of the alternating currents occurring on the subscriber line and the DC reference voltage, it is assured that such alternating currents do not result in a loop closure indication.

If the current flowing in the subscriber line is to be limited, a threshold device is provided, as FIG. 2 also shows, in the form of a diode D1 which is normally biased in non-conducting direction. This bias is effected by means of a voltage divider consisting of the resistors R5, R6 and R7, as well as a transistor Q2 in whose control circuit the diode D1 is located. The output voltage of the first differential amplifier A1 is supplied to the threshold device via a filter section formed by a resistor R7 and capacitor C1. If, due to an inadmissably high current in the subscriber line, the output voltage of the first differential amplifier A1 exceeds the threshold value of the threshold device and the diode D1 becomes conductive, the resulting voltage change in the control circuit of the transistor Q2 changes the transistor's state of conductivity. Since the collector of this transistor is connected with the terminal through which a reference voltage is supplied to the first operational amplifier OP1, such a change of conductivity causes also a change of reference voltage to the extent that the output voltages of the operational amplifiers OP1 and OP2 become approximately equal. This results in a reduction of the voltage across the a-wire and b-wire of the subscriber line, thereby limiting the current flowing over this line. Rapid variations of the supply voltage are smoothed by a filter formed by the resistor R9 and capacitor C2.

The circuit arrangement illustrated in FIG. 2 is configured so that, in addition to the above-mentioned functions, it is also possible to detect an asymmetry of the current flowing over the line wires of the subscriber access line. Such an asymmetry occurs either in case of ringing current injection into the subscriber line or, without such current injection, when there is ground key actuation or when the a-wire is connected to ground at low resistance due to faulty insulation. For the purpose of such detection, the circuit arrangement according to FIG. 2 comprises further a third differential amplifier A3, a fourth differential amplifier A4 and an electronic switch in the form of a transistor Q3. The inputs of the differential amplifier A3 are energized by the same input voltages as those of the first differential amplifier A1. The fourth differential amplifier A4 is utilized as a comparator, which compares the output voltage of differential amplifier A3 with a reference voltage. The output signal of the fourth differential amplifier A3 serves as a control signal for the transistor Q3. The circuit parameters are selected so that when an asymmetry of the DC flow occurs on the subscriber line, the output voltage of the differential amplifier A3, which is proportional to this asymmetry, falls short of a given threshold value and the asymmetry is indicated at the output GK. In particular, the output signal delivered by the differential amplifier A4 switches the transistor Q3 to the conductive state, thus changing the collector potential GK. In this connection, a capacitor CR bridging a feedback resistor Rr4 of the differential amplifier A3 prevents alternating current signals on the subscriber line from being indicated as an asymmetry.

In the circuit arrangement according to FIG. 2 it is possible to remove the operating voltage from the subscriber line by applying a signal PDWN to the point of connection of the voltage divider resistors R5 and R6. This signal PDWN may take the form of a potential change, for example from +5 V to a lower potential such that the transistor Q2 switches over to the fully conducting state. As a result, the reference voltage for the operational amplifier OP1 is changed to the extent that, at its output, approximately the same potential occurs as at the output of operational amplifier OP2 and thus the potential difference between the a-wire and b-wire of the subscriber line becomes approximately zero.

Figure 3:
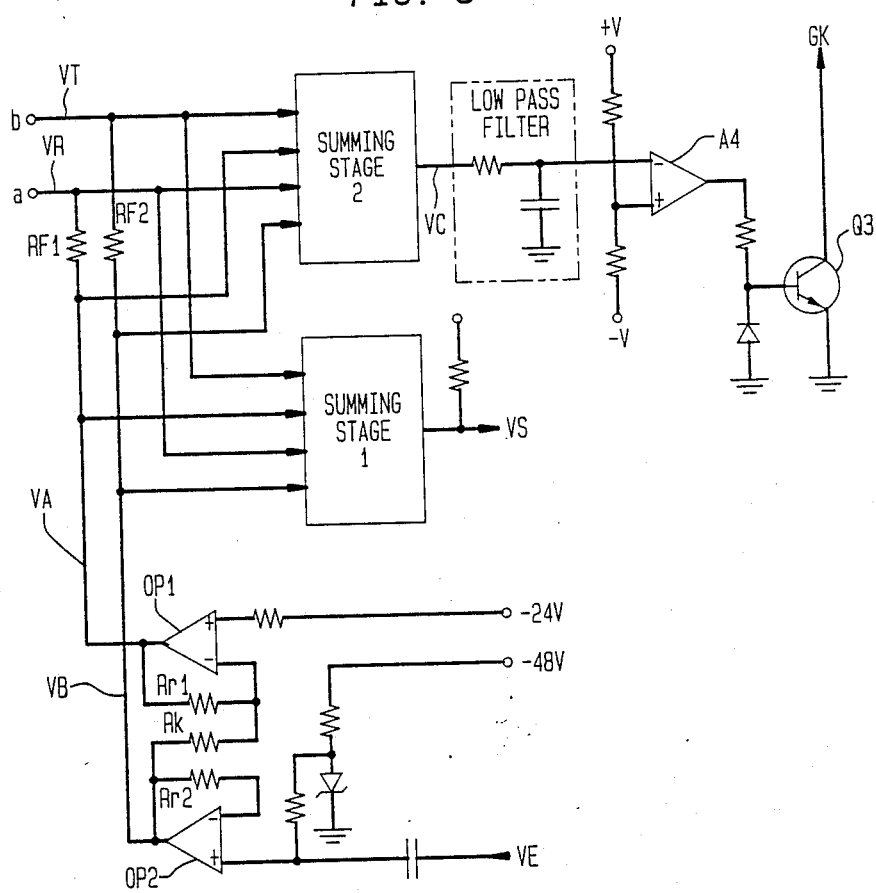
FIG. 3 is a schematic diagram of a transformerless hybrid for a subscriber line interface circuit according to another preferred embodiment of the present invention.

FIG. 3 shows an alternative embodiment of the transformerless hybrid circuit arrangement according to the invention in which two four-input summing stages have been substituted for the differential amplifiers A1 and A3 with their associated resistors. This embodiment makes possible the use of well-known integrated circuit manufacturing techniques in a monolithic implementation of the circuit, since there is no need for resistors of high absolute accuracy (only close matching) and the resistance of the individual circuit resistors can be kept relatively low (under 200K ohms).

With the exception of the summing stages, the circuit arrangement of FIG. 3 may be made substantially identical to that of FIG. 2.

The summing stages 1 and 2 receive identical inputs but produce different outputs VS and VC, respectively. The output voltages $V_A$ and $V_B$ from the operational amplifiers OP1 and OP2, respectively, are applied to two inputs of the summing stages; the tip lead voltage $V_T$ and the ring lead voltage $V_R$ are applied to the other two inputs of the summing stages. Since the voltage across RF1 equals $V_R - V_A$ the current through this resistor equals $(V_R - V_A)/RF1$. Similarly, the current through the resistor RF2 equals $(V_T - V_B)/RF2$. For the summing stage 1, we wish to subtract the current $I_{RF1}$ from $I_{RF2}$. Assuming RF1=RF2=RF, therefore:

$$VS = K(V_B + V_R - V_A - V_T).$$

Similarly, in the summing stage 2 we wish to add the currents $I_{RF1}$ and $I_{RF2}$. Assuming RF1=RF2=RF, then:

$$VC = K(V_T + V_R - V_A - V_B).$$

In the above equations K is a constant determined by the gain of the respective summing stage and the resistence RF.

The summing stages 1 and 2 therefore operate to produce the respective outputs VS and VC from the four inputs $V_A$, $V_B$, $V_T$ and $V_R$. Such stages are well known and may be implemented using conventional integrated circuit manufacturing techniques.

As is shown in FIG. 3, the output VC may be applied to the differential amplifier A4 via a low pass filter to eliminate the effect of voltage transients on the following threshold circuit.

Figure 4:
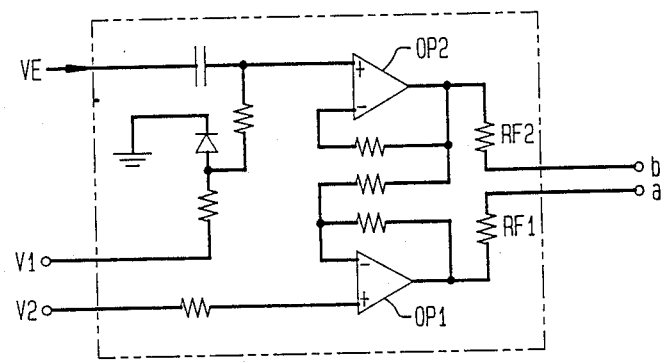
FIG. 4 is a schematic diagram of a transformerless circuit arrangement for providing a balanced AC and a controlled DC voltage to a subscriber line.
Figure 5:
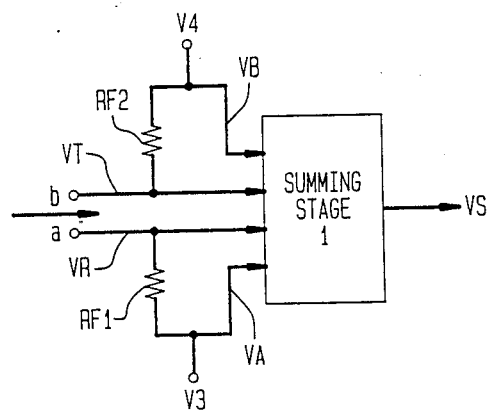
FIG. 5 is a schematic diagram of a transformerless circuit arrangement for converting a balanced AC signal, as appears on a subscriber line, to a conventional unbalanced signal with respect to ground.
Figure 6:
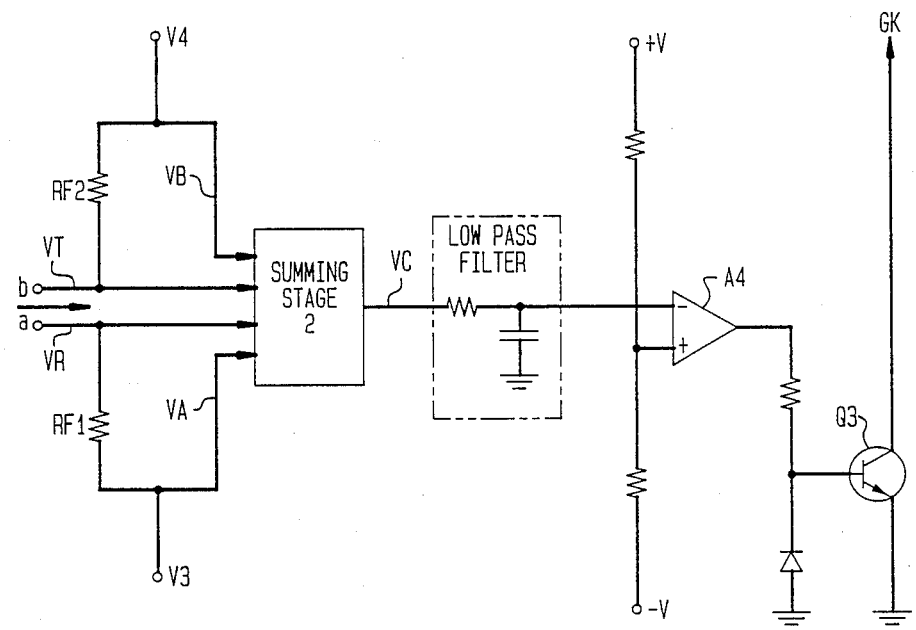
FIG. 6 is a schematic diagram of a third circuit arrangement according to the present invention for detecting asymmetry in the current flowing over a two-wire subscriber line.

FIGS. 4–6 illustrate how the individual portions of the circuit of FIG. 3 may be utilized separately and independently of each other. FIG. 4 shows the circuit arrangement comprising operational amplifier OP1 and OP2 for supplying a balanced AC voltage and a controlled DC voltage to the two subscriber line wires a and b. As pointed out previously, the balanced AC voltage is dependent upon the AC signal VE, whereas the DC voltage (power) is controlled by the voltage V2.

FIG. 5 shows the circuit arrangement for converting a balanced AC voltage on the wires a and b into an AC signal VS using the summing stage 1. The voltages VR and VT on the wires a and b, respectively, are applied directly to the summing stage; voltages VA and VB are equal to DC bias voltages V3 and V4, respectively. The wires a and b terminate in equal valued resistors RF1 and RF2, respectively.

FIG. 6 shows the circuit for detecting asymmetry in the current flowing over the two wires a and b. The summing stage 2 is connected to the wires a and b in the same manner as is shown in FIG. 5 for the summing stage 1. Operation of this circuit is identical to that of the corresponding circuitry in FIG. 3.

Figure 7:
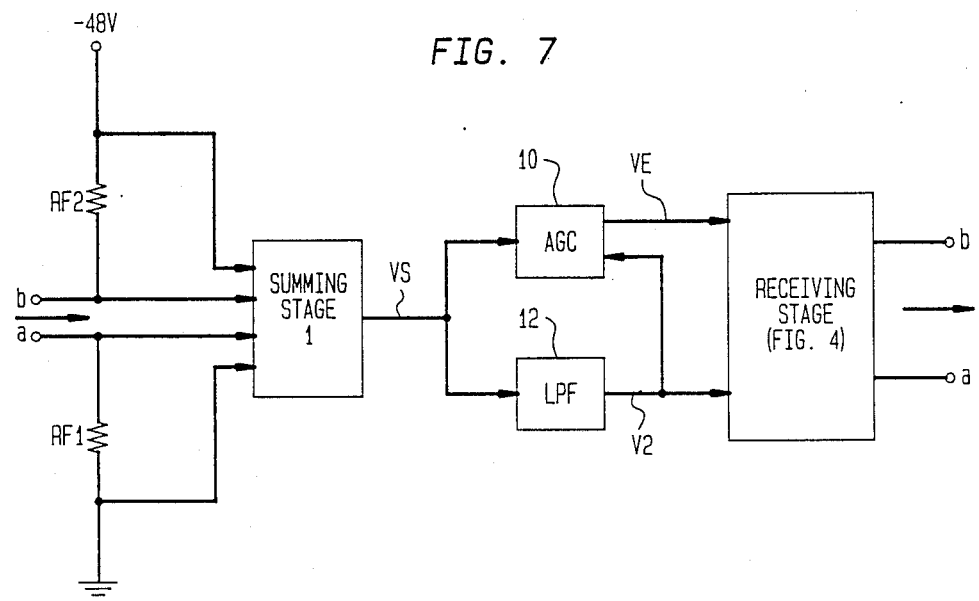
FIG. 7 is a schematic diagram of a transformerless, repeater for one two-wire branch of a four-wire telephone line.

FIG. 7 shows a unidirectional repeater circuit for a two-wire branch of a four-wire telecommunication line. The left-hand portion of this circuit, including the resistors RF1 and RF2 and the summing stage 1, is identical to the circuit arrangement shown in FIG. 5. The receiving stage of the repeater is identical to the circuit arrangement shown in FIG. 4. The receiving stage is connected to the summing stage 1 via an automatic gain control (AGC) amplifier 10 and a low pass filter (LPF) 12. The low pass filter provides a control signal V2 representative of the average DC level of the signal VS. This signal V2 is applied to the AGC amplifier 10 as an inverse gain control so that the signal VE applied to the receiving stage is of substantially constant level.

It will be understood by those skilled in the art that the receiving and transmitting apparatus of FIGS. 4 and 5 is subject to many uses and applications. For example, this apparatus may be utilized in a bidirectional repeater circuit for a two-wire subscriber line. Such a repeater may be supplied DC voltages (−24 V and −48 V) from a separate DC power supply connected to the mains; in the alternative, the power may be derived from the DC voltage phantomed onto the two wire subscriber line.

There has thus been shown and described novel receiving and transmitting apparatus which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. A telecommunication DC line current asymmetry detection circuit comprising:

a summing stage having first, second, third, and fourth inputs and an output, said summing stage being connected to the telecommunication line for providing at said output an output voltage proportional to VT+VR−VA−VB where VR is the voltage on a first wire of the telecommunication line;

VT is the voltage on a second wire of the telecommunication line, said first and second inputs being connected to said first and second wires, respectively;

VA is a voltage at a first terminal of a first resistor connected to said first wire, said first terminal being further connected to a first reference voltage;

VB is a voltage at a second terminal of a second resistor connected to said second wire, said second terminal being further connected to a second reference voltage, said third and fourth inputs being connected to said first and second terminals, respectively;

a low pass filter coupled to said output of said summing stage for filtering the effects of voltage transients; and a threshold circuit comprising a comparator for comparing the output of said low pass filter with a pre-established threshold value and providing an output indicating an asymmetric DC line current condition when said threshold is exceeded.

2. The telecommunication DC line current asymmetry detection circuit of claim 1 further comprising:

an electronic switch connected to the output of said threshold circuit for providing a control signal indicating said asymmetric DC line current condition.

3. A telecommunication DC line current asymmetry detection circuit comprising:

a summing stage having first, second, third, and fourth inputs and an output, said summing stage being connected to the telecommunication line for providing at said output an output voltage proportional to $VT+VR-VA-VB$ where VR is the voltage on a first wire of the telecommunication line;

VT is the voltage on a second wire of the telecommunication line, said first and second inputs being connected to said first and second wires, respectively;

VA is a voltage at a first terminal of a first resistor connected to said first wire, said first terminal being further connected to a first reference voltage;

VB is a voltage at a second terminal of a second resistor connected to said second wire, said second terminal being further connected to a second reference voltage, said third and fourth inputs being connected to said first and second terminals, respectively;

a low pass filter responsive to said output voltage for providing a control signal output;

an automatic gain control circuit controlled by said control signal output of said low pass filter, said automatic gain control circuit providing an AC signal output;

a threshold circuit comprising a comparator for comparing the output of said low pass filter with a pre-established threshold value and providing an output indicating an asymmetric DC line current condition when said threshold is exceeded; and an electronic switch coupled to said output of said threshold circuit for providing a control signal indicating said asymmetric DC line current condition.

* * * * *